Dec. 26, 1950  K. J. KLENK  2,535,215
GRIPPING OR CUTTING HAND TOOL
Filed Dec. 27, 1948
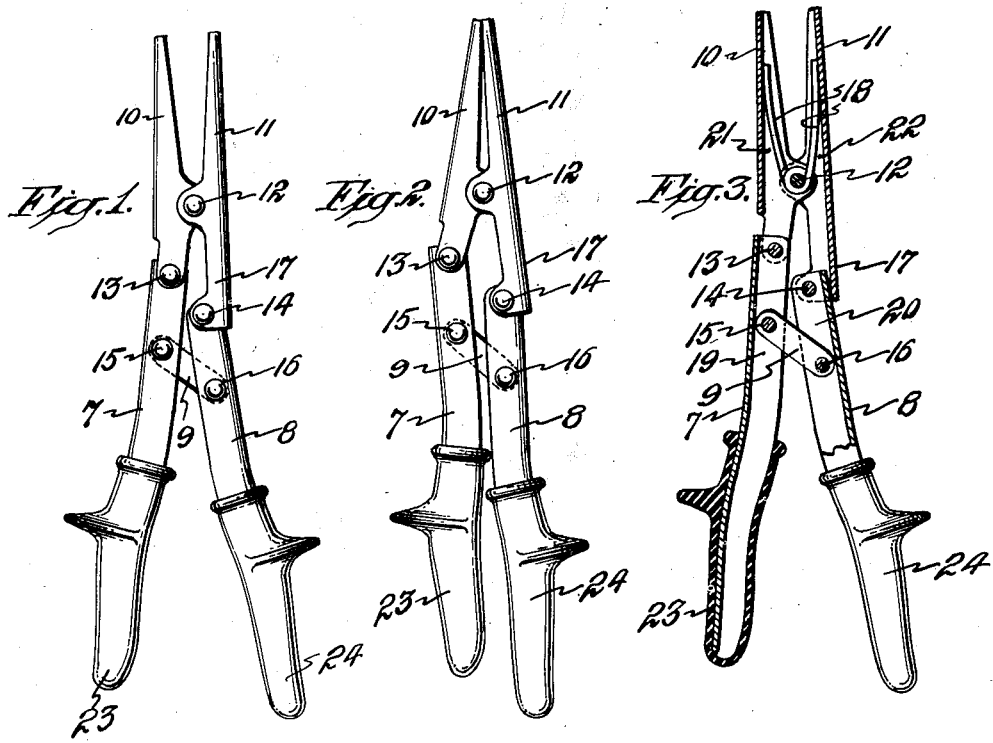
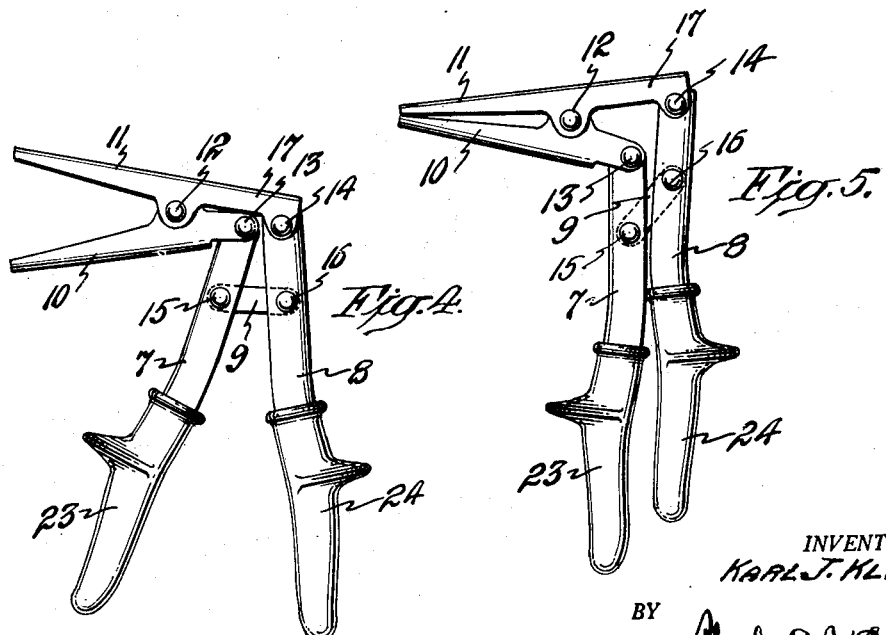
INVENTOR.
KARL J. KLENK
BY
ATTORNEY Patented Dec. 26, 1950

2,535,215

UNITED STATES PATENT OFFICE 2,535,215

GRIPPING OR CUTTING HAND TOOL

Karl J. Klenk, Wilmington, Del.

Application December 27, 1948, Serial No. 67,390

3 Claims. (Cl. 81—44)

The invention herein disclosed relates to hand tools of the pliers or shears type, involving jaws or blades cooperatively actuated by hand levers.

Objects of the invention are to provide a tool of this nature in which the jaw members may be shifted around to different angles and operated and used in all of such different angular relations.

Particularly it is a purpose of the invention to effect firm gripping and holding operation of the jaws in all angular relations and desirably, also, while shifting through from one angular relation to another.

Important objects of the invention are to attain all the foregoing with a simple, practical, reliable, low cost form of construction.

Also it is an object of the invention to accomplish such results in a structure consisting of few simple parts, all of strong, rugged construction.

Other desirable objects and the novel features through which the purposes of the invention are attained are set forth or will appear in the course of the following specification.

The drawing accompanying and forming part of the specification illustrates a present commercial embodiment of the invention in the form of a pair of pliers. Structure, however, may be modified and changed in various ways, all within the proper intent of the invention as hereinafter defined and claimed.

Fig. 1 in the drawing is a side elevation showing the tool held in a partly opened, straightened relation, ready to be closed over an object such as a bolt, nail, cotter-pin or the like;

Fig. 2 is a similar view showing the hand levers operated to close the jaws in this particular straightened form or relation of the tool;

Fig. 3 is a broken, part longitudinal, sectional view of the tool in the partly opened condition shown in Fig. 1;

Fig. 4 is a side elevation showing the jaws angled around to the side at approximately 100° to the relation shown in Fig. 1;

Fig. 5 is a similar view showing the jaws as closed in this more or less rectangular relation of the tool.

Essentially the tool consists of but few main parts, a pair of hand levers 7, 8, pivotally connected intermediate their ends by a swinging link 9 and a pair 10, 11, of what may be termed the jaw members, whether they be used for cutting or gripping or both, pivotally connected intermediate their ends at 12 and pivotally connected at their inner ends with the inner ends of the hand levers at 13, 14.

The swinging link 9 is pivotally connected at its opposite ends at 15, 16, with the hand levers 7, 8, and it will be noted that the distances between pivot centers 13, 15, and 14, 16, are approximately equal and substantially equal as well to the distance between the pivot centers 15, 16, of the swinging link. This provides or allows for a somewhat parallel range of action between the hand levers and the jaw levers and this, together with the fact that one of the jaw levers, 11, is extended inward at 17 to a greater length than the other jaw lever, 10, enables the jaws to swing from a substantially straight handle relation as in Figs. 1, 2 and 3, clear around to a substantially right angled relation, Figs. 4 and 5.

In both the straightened relation and in the right angled position, as well as all intermediate angled positions, the jaws may be closed and opened by gripping and releasing movements of the handles. Also, the jaws may be swung through a wide arc of operation by applying relative endwise pressure on the handles to shift one longitudinally in respect to the other, the jaw closing and opening movements being possible in all these positions and actually while swinging the jaws through such angles, by gripping and releasing movements on the handles.

In the straightened position shown in Fig. 1, the jaws may be closed by gripping the handle members together as in Fig. 2, the handle lever 8 in such case swinging on pivot 16. With longitudinal movement of handle lever 8 up over handle lever 7, the pivot link 9 will swing upwardly from the Fig. 2 to the Figs. 4 and 5 positions, with the jaws swinging bodily about the pivot 13 on the end of lever 7 and the longer length jaw 11—17 in effect reaching over around the end of handle lever 7. Endwise movement of lever 8, permitted by swinging link 9, will effect closing of the jaws from the Fig. 4 to the Fig. 5 position.

Composite gripping and relative longitudinal movements of the handle levers will effect various jaw closing and angular swinging movements of the jaws as necessary to accomplish different operations. The longer length jaw permits the two jaws to swing bodily about the end of the first handle lever 7, and the pivot link connecting the levers permits the levers to shift longitudinally as well as to be rocked in respect to each other to effect the angular swinging movements and the opening and closing movements of the two jaws.

The swinging link 9 operates at times as a toggle and a lever for effecting angular adjustment of the jaws, and at all times as a fulcrum for applying opening and closing force on the jaws.

A spring 18 looped about the jaw pivot 12 and engaging inside the outer projecting end portions of the jaws, serves to hold the jaws normally open and aids in opening the jaws and holding the hand levers in proper gripping relation in all the various angular positions of the jaws.

For lightness and strength the hand levers and jaws may be of folded metal substantially as indicated, and arranged with the substantially U-shaped open cross sections of the same in opposing relation providing, as shown in Fig. 3, enclosing spaces 19, 20, within the hand levers for accommodating the swinging link and enclosing spaces 21, 22, within the jaws for accommodating, concealing and protecting the opposing arms of the jaw opening spring 18.

The outer ends of the hand levers are shown as covered by hand grips 23, 24, which may be of any usual or special construction, desirably of insulating material if the tool is to be used for electrical purposes.

The uses of the tool are many and varied. While particularly useful for pliers purposes, it may be designed for many special uses, such as for holding welding rods, for holding and positioning nails and bolts or for pulling or placing cotter-pins in inaccessible places, around corners and the like. The tool is of particular utility in the aircraft industry, where parts must be reached and placed in small, relatively inaccessible channels and confined spaces.

What is claimed is:

1. A tool of the hand grip type comprising hand levers having hand grip handles at the outer ends thereof, a swinging link pivotally connecting said levers intermediate their ends and companion jaws pivotally connected intermediate their ends and having their inner ends pivotally connected with the inner ends of said hand levers, one of said jaws being longer and having its inner end extended a greater distance than the other jaw whereby to offset the pivotal connections between the jaws and hand levers and to enable the jaws to swing into different angular relations in respect to the hand levers.

2. A tool of the hand grip type comprising hand levers having hand grip handles at the outer ends thereof, a swinging link pivotally connecting said levers intermediate their ends, companion jaws pivotally connected intermediate their ends and having their inner ends pivotally connected with the inner ends of said hand levers, one of said jaws being longer and having its inner end extended a greater distance than the other jaw whereby to offset the pivotal connections between the jaws and hand levers, and a jaw opening spring between said jaws.

3. A tool of the hand grip type comprising hand levers having hand grip handles at the outer ends thereof, a swinging link pivotally connecting said levers intermediate their ends, companion jaws pivotally connected intermediate their ends and having their inner ends pivotally connected with the inner ends of said hand levers, one of said jaws being longer and having its inner end extended a greater distance than the other jaw whereby to offset the pivotal connections between the jaws and hand levers, and a jaw opening spring between said jaws, said hand levers and jaws being of folded metal U-shaped in cross section, and arranged with the open sides in opposition, the swinging link and jaw opening spring seating in said opposing U-shaped cross sections.

KARL J. KLENK.

REFERENCES CITED

The following references are of record in the file of this patent:

UNITED STATES PATENTS

| Number | Name | Date |
|---|---|---|
| 338,326 | Wilson | Mar. 23, 1886 |
| 509,920 | Lindsay | Dec. 5, 1893 |
| 733,919 | Schwartz | July 14, 1903 |
| 1,484,100 | Wertz | Feb. 19, 1924 |
| 2,084,194 | Frank | June 15, 1937 |
| 2,109,147 | Grosso | Feb. 22, 1938 |
| 2,399,454 | Svell | Apr. 30, 1946 |